No. 847,468. PATENTED MAR. 19, 1907.
T. W. GOREAU.
LIQUID SEAL TRAP.
APPLICATION FILED DEC. 27, 1906.
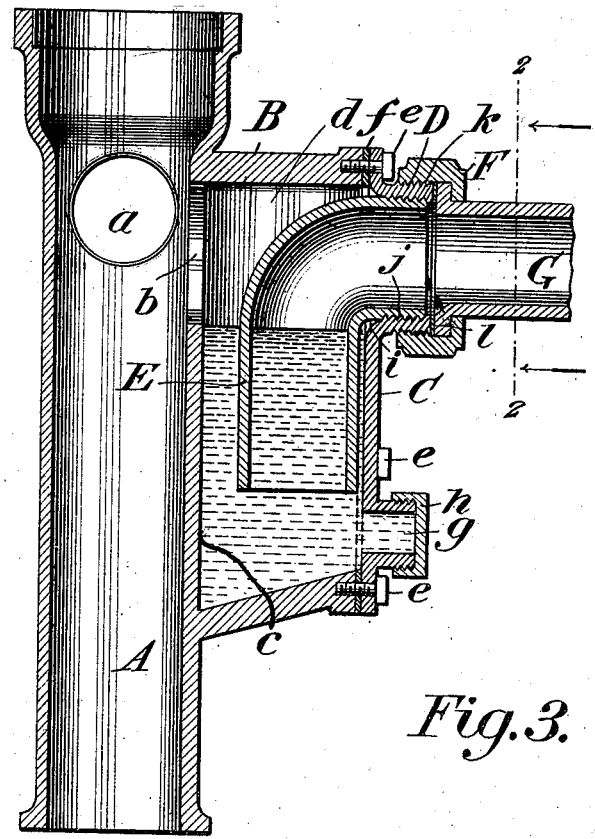
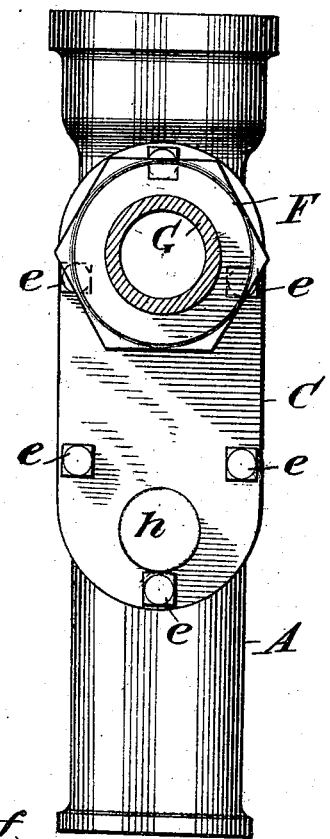
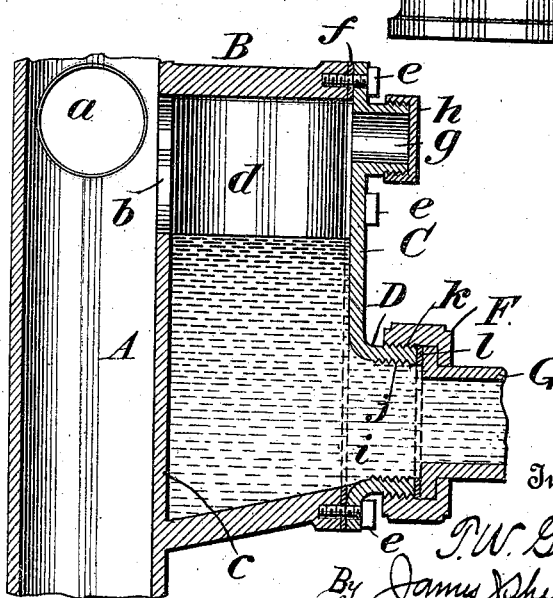
Witnesses
Phil. E. Barnes
J. J. Shahy Jr.
Inventor
T. W. Goreau
By James Shahy
Attorney

UNITED STATES PATENT OFFICE.

THOMAS W. GOREAU, OF NEW ORLEANS, LOUISIANA.

LIQUID-SEAL TRAP.

No. 847,468.     Specification of Letters Patent.     Patented March 19, 1907.

Application filed December 27, 1906. Serial No. 349,710.

*To all whom it may concern:*

Be it known that I, THOMAS W. GOREAU, a citizen of the United States, residing at New Orleans, in the parish of Orleans and State of Louisiana, have invented new and useful Improvements in Liquid-Seal Traps, of which the following is a specification.

My invention pertains to plumbing, and more particularly to traps of the liquid-seal type; and it contemplates the provision of a trap having a reversible cover-plate and otherwise constructed in such manner that a fit may be readily made to a certain measurement in a limited space.

The invention will be fully understood from the following description and claims when the same are read in connection with the accompanying drawings, forming part of this specification, in which—

Figure 1 is a vertical section illustrating my novel trap with the cover-plate in one position and also illustrating the elbow which is employed when the cover-plate is in said position. Fig. 2 is a detail section taken in the plane indicated by the line 2 2 of Fig. 1 looking in the direction indicated by the arrow. Fig. 3 is a view similar to Fig. 1, but showing the cover-plate reversed and the elbow omitted.

Similar letters designate corresponding parts in all of the views of the drawings, referring to which—

A is a pipe which is shown as a soil-pipe having a revent connection $a$, though it may be a pipe of any other description compatible with the purpose of my invention without involving departure from the scope thereof. The said pipe A is peculiar in that it is provided at one side with a water-seal chamber B, which is connected with the interior of the pipe through a vent and waste passage $b$. As shown in Figs. 1 and 3, the water-seal chamber B is formed by the portion $c$ of the pipe-wall, a side wall or walls $d$ extending laterally with respect to the pipe, and a cover-plate $c$. This cover-plate may be of the form illustrated in outline or of any other approved form and is detachably connected to the wall $d$ through the medium of screws $e$ or other suitable means, a gasket $f$ being interposed between the plate and the edge of the wall $d$, as shown, in order to render the connection perfectly water-tight. In the cover-plate, adjacent to one end thereof, is preferably provided a clean-out aperture $g$, normally closed by a removable screw $h$, while adjacent to its opposite end the cover-plate is provided with a comparatively large aperture $i$, surrounded by an outwardly-extending nipple D, interiorly threaded, as indicated by $j$, and exteriorly threaded, as indicated by $k$. The interior thread $j$ of said nipple is for the engagement of an exteriorly-threaded elbow E, which is employed to conduct the waste, &c., into the water seal when the cover-plate C is positioned as shown in Fig. 1, while the exterior thread $k$ is for the engagement of a coupling F, which has for its function to detachably connect the nipple to a piece of pipe G, leading from a fixture, (not shown,) the connection between the nipple and piece of pipe being rendered water-tight by an interposed washer $l$, as shown. The coupling illustrated is but one of many types that may be employed, and I therefore do not desire to be understood as limiting myself to any particular coupling.

In the practical use of my improvement, with the parts arranged as shown in Fig. 1, it will be apparent that the elbow E conducts all of the waste down into the receptacle afforded between pipe A, wall $d$, and cover-plate C, and consequently an adequate water seal is continuously maintained. When the cover-plate C is reversed and the elbow E is dispensed with, as shown in Fig. 3, it will be seen that the waste passes through the aperture $i$ directly into the chamber B, and yet a water seal of the same size as in Fig. 1 is continuously maintained in the receptacle formed by the pipe-wall $c$, wall $d$, and cover-plate C.

It will be gathered from the foregoing that the adjustable feature of my novel trap enables a mechanic to bring the connections within a very small space, also that the trap as a whole is advantageous because of its simplicity and the facility with which access may be gained to its interior for repairs or other purposes, and also because the trap has no fouling-space and it is not possible to siphon the same from a fixture.

While I have shown the pipe A as equipped with but one liquid-seal trap, I desire it understood that the said pipe may be provided, in the discretion of the manufacturer, with either one or a plurality of the said traps without involving departure from the scope of my invention as claimed.

Having described my invention, what I claim, and desire to secure by Letters Patent, is—

1. A trap of the liquid-seal type, comprising a pipe, a seal-chamber arranged at one side of the pipe and having its upper portion connected through a passage with the interior of the pipe, and a reversible cover-plate detachably connected to the seal-chamber and provided adjacent to one of its ends with means for the connection of a pipe-section.

2. A trap of the liquid-seal type, comprising a pipe, a seal-chamber arranged at one side of the pipe and having its upper portion connected through a passage with the interior of the pipe, and a reversible cover-plate detachably connected to the seal-chamber and provided adjacent to one of its ends with means for the detachable connection of an elbow designed to extend down in the seal-chamber and also provided adjacent to said end with means for the connection of a pipe-section.

3. A trap of the liquid-seal type, comprising a pipe, a seal-chamber arranged at one side of the pipe and having its upper portion connected through a passage with the interior of the pipe, and a reversible cover-plate detachably connected to the seal-chamber and provided adjacent to one of its ends with an interiorly and exteriorly threaded nipple.

4. A trap of the liquid-seal type, comprising a pipe, a seal-chamber arranged at one side of the pipe and having its upper portion connected through a passage with the interior of the pipe, a reversible cover-plate detachably connected to the seal-chamber and provided adjacent to one of its ends with an interiorly and exteriorly threaded nipple, an exteriorly-threaded elbow engaging the interior thread of the nipple and extending down in the seal-chamber, and means engaging the exterior thread of the nipple for connecting a pipe-section thereto.

5. A trap of the liquid-seal type, comprising a pipe, a seal-chamber arranged at one side of the pipe and formed by a portion of the pipe-wall in connection with side walls extending laterally from the pipe; said seal-chamber having its upper portion connected through a passage in the pipe-wall with the interior of the pipe, and a reversible cover-plate detachably connected to the side walls of the seal-chamber and provided adjacent to one of its ends with means for the detachable connection of a pipe-section.

In testimony whereof I have hereunto set my hand in presence of two subscribing witnesses.

THOMAS W. GOREAU.

Witnesses:
P. FRIEDMANN,
JOSEPH BAGERT.